United States Patent

Brenner et al.

[11] Patent Number: 5,909,938
[45] Date of Patent: Jun. 8, 1999

[54] COLLISION PROTECTIVE ARRANGEMENT FOR THE MEASURING ARM OF A COORDINATE MEASURING APPARATUS

[75] Inventors: Kurt Brenner, Satteldorf; Karl Seitz; Peter Ahnelt, both of Oberkochen; Roland Roth, Waldstetten; Walter Dominicus, Königsbronn, all of Germany

[73] Assignee: Carl-Zeiss-Stiftung, Heidenheim/Brenz, Germany

[21] Appl. No.: 08/713,463

[22] Filed: Sep. 13, 1996

[30] Foreign Application Priority Data

Sep. 16, 1995 [DE] Germany .......................... 295 14 892

[51] Int. Cl.[6] .................................................. G01B 5/004
[52] U.S. Cl. .................................................. 33/503; 901/49
[58] Field of Search .................................. 33/503; 901/49

[56] References Cited

U.S. PATENT DOCUMENTS 5,038,488  8/1991  Abramowsky et al. .................. 33/503
5,269,068  12/1993  Seitz .......................... 33/503
5,396,712  3/1995  Herzog .

FOREIGN PATENT DOCUMENTS 0215233  3/1987  European Pat. Off. .
3927245  2/1991  Germany .
4238139  5/1994  Germany .

*Primary Examiner*—Diego Gutierrez
*Assistant Examiner*—Andrew Hirshfeld
*Attorney, Agent, or Firm*—Walter Ottesen

[57] ABSTRACT

The invention is directed to a collision protective arrangement for a measuring arm of a coordinate measuring apparatus for measuring a workpiece. The measuring arm has a surface facing toward the workpiece. The collision protective arrangement includes a part for covering and protecting the surface; and, a circuit switchable between a first electrical state wherein no contact is present between the part and the workpiece and a second electrical state indicative of a collision between the workpiece and the part. The surface of the measuring arm and the part conjointly define an interface and the circuit includes a plurality of resiliently-biased contact pins and contacts mounted at the interface to coact to switch the circuit into the second electrical state when the collision takes place.

11 Claims, 3 Drawing Sheets

COLLISION PROTECTIVE ARRANGEMENT FOR THE MEASURING ARM OF A COORDINATE MEASURING APPARATUS

BACKGROUND OF THE INVENTION

It is known to protect the measuring arm of a coordinate measuring apparatus against collision with the workpiece or with operating personnel. Protective arrangements of this kind are disclosed, for example, in U.S. Pat. Nos. 5,038,488 and 5,269,068. In these known collision protective arrangements, a bellows completely covering the measuring arm is utilized to activate the protective arrangement. The bellows includes special cutouts in its struts through which light beams or electrically-conductive wires are guided. The light beams are interrupted by the bellows or the wires come into contact therewith when the bellows is displaced by an obstacle. This interruption or contact generates a switching signal which stops the movement of the machine.

These known solutions are relatively complex and require a bellows surrounding the measuring arm, but this bellows does not necessarily have to be provided in each case. Coordinate measuring apparatus are available in a great many different configurations and types and the measuring arm carrying the probe is not necessarily movable in a purely linear direction. For example, U.S. Pat. No. 5,396,712 discloses a coordinate measuring apparatus of the so-called pivot-arm type wherein the measuring arm, which carries the probe, is rotatably journalled about two axes. The extended length of the measuring arm of this type of apparatus does not change and therefore there are also no guides which are exposed and would have to be protected against contamination. For this reason, the apparatus has no bellows. On the other hand, the pivot arm of the apparatus is linearly movable in the direction of the pivot axes and is caused to motorically track the deflections of the probe in this direction This then presents the problem that the pivot arm can run up against the workpiece and become damaged in the course of this tracking movement.

SUMMARY OF THE INVENTION

In view of the above, it is an object of the invention to provide a simply configured and low-cost collision protective arrangement for the measurement arm of a coordinate measuring apparatus which requires no bellows. The collision protective arrangement especially solves the problem presented above for coordinate measuring apparatus of the pivot-arm type in the simplest manner possible.

The collision protective arrangement of the invention is for a measuring arm of a coordinate measuring apparatus for measuring a workpiece. The measuring arm has at least a surface and the collision protective arrangement includes: a part for covering and protecting the surface; a circuit switchable between a first electrical state wherein no contact is present between the part and another object and a second electrical state indicative of a collision between the part and another object; the surface and the part conjointly defining an interface; and, the circuit including a plurality of electrically connected resiliently-biased contact pins mounted at the interface to switch the circuit into the second electrical state when the collision takes place.

The solution according to the invention affords several advantages. One advantage is that only a relatively simple and low-cost part is needed which covers the measuring arm at the location to be protected. For example, this part can be a simple piece of sheet metal in lieu of a bellows. This covering part coacts with resiliently biased contact pins which likewise are inexpensive to make and are available at low cost and are very simply connected to each other electrically. For example, the contact pins can be connected in parallel in that they are seated directly in the measuring arm made of conductive material. These contact pins have a long displacement path so that adequate time is available in order to switch off the drives and to brake the machine before the part colliding with the measuring arm applies forces thereto and deforms the same.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
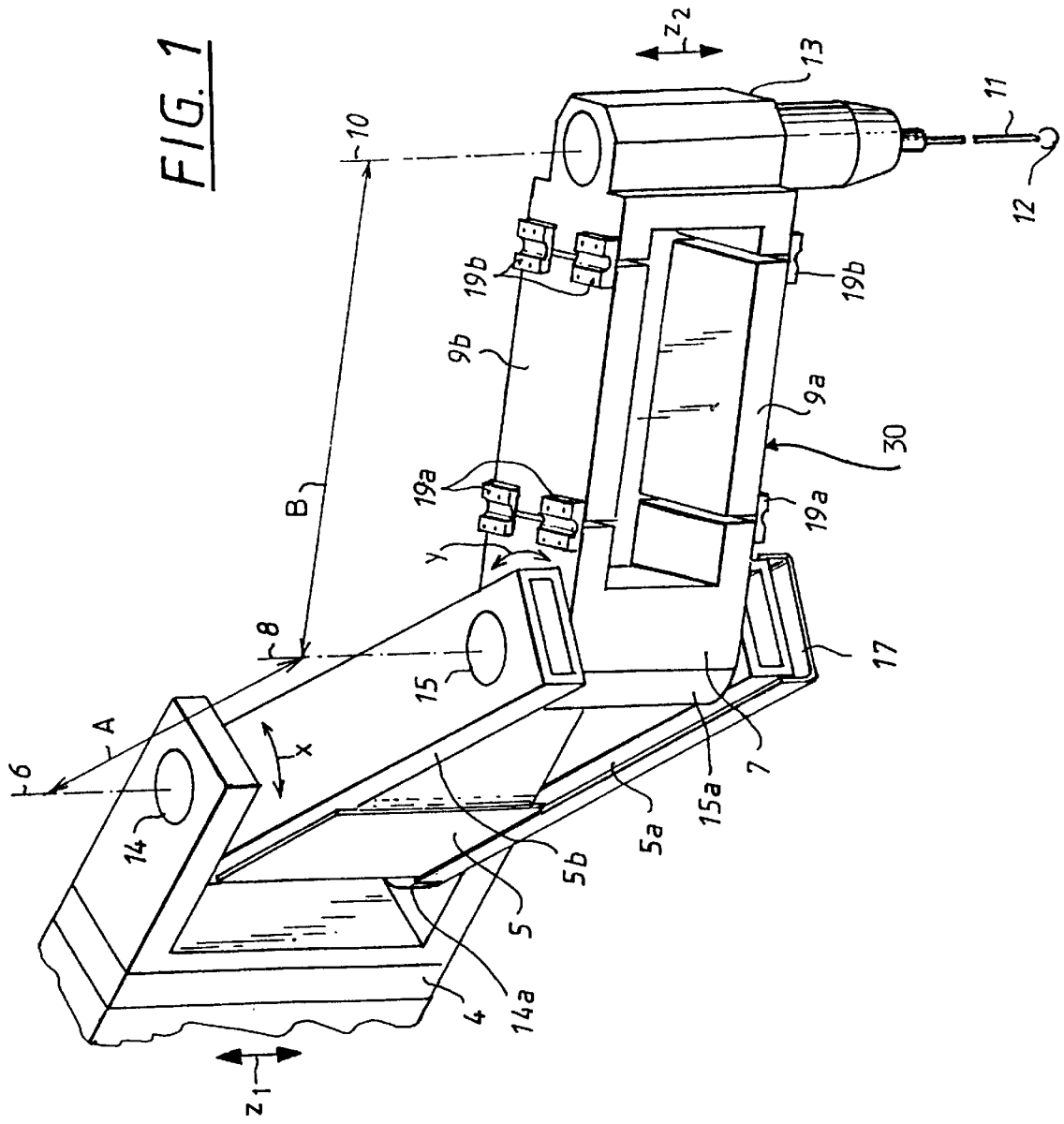
FIG. 1 is a simplified perspective schematic showing the measuring arm of a coordinate measuring apparatus of the pivot arm type with the measuring arm being rotatable about two axes.

The measuring arm shown in FIG. 1 corresponds to a coordinate measuring apparatus of the type shown, for example, in U.S. Pat. No. 5,396,712 incorporated herein by reference. The base of the coordinate measuring apparatus, together with the workpiece table and the vertical column defining the z-axis, are not shown in FIG. 1. A fork-shaped carrier on the z-column can be driven motorically to track vertically in the direction of the arrow $z_1$.

Bearings are provided in both legs of the carrier 4 for a shaft 14 connecting the legs. This shaft 14 defines a first vertical rotational axis 6. A first pivot arm 5 is attached to the shaft 14 so that it can pivot horizontally as indicated by arrow x. The angular measuring system required to detect the pivot movement is not shown in FIG. 1 for the sake of simplicity.

The pivot arm 5 likewise has a fork-shaped configuration. The ends of the legs (5a and 5b) of the fork-shaped pivot arm support the bearings for a second shaft 15. This shaft defines the second rotational axis 8 which is at a spacing A to the first rotational axis 6 and is aligned parallel thereto. A second pivot arm 30 is attached to the shaft 15 and is rotatable about the axis 8 as indicated by arrow y.

This second pivot arm comprises three parts and is configured in the form of a spring parallelogram in order to be able to manually deflect the carrier 13 in the vertical direction as indicated by arrow $z_2$. The carrier 13 defines an axis 10 which is at a spacing B to the second rotational axis 8 and is aligned parallel thereto. The carrier 13 is provided for the probe of the apparatus and is mounted at the forward end of the second pivot arm 30. The probe carries a probe pin 11 having probe ball 12 at its lower side and the probe pin 11 is journalled so as to yield.

The spring parallelogram is realized by two parallelly arranged legs (9a and 9b). Each of the legs has a first end provided with a pair of joint springs 19a which connect the first end to a leg of the part 7 and a second end which is provided with a further pair of joint springs 19b for connection to one of the two ends of the carrier 13. The part 7 is located between the legs 5a and 5b of the first pivot arm 5 and is journalled on the shaft 15.

With the coordinate measuring apparatus described above, workpieces can be measured in that the carrier 13 is manually moved and the probe ball 12 so placed on the surface of the workpiece (not shown) to be measured. With a manual deflection of the spring parallelogram (9a, 9b) in the direction of arrow $z_2$, a sensor responds which ensures that the carrier 4 is caused by a drive to track the deflecting movement as symbolized by arrow $z_1$.

During measurement with this apparatus, it can happen in the course of the above-mentioned tracking movement that one of the two pivot arms comes into contact with the workpiece to be measured. The following measures are provided to avoid this type of collision.

Figure 2:
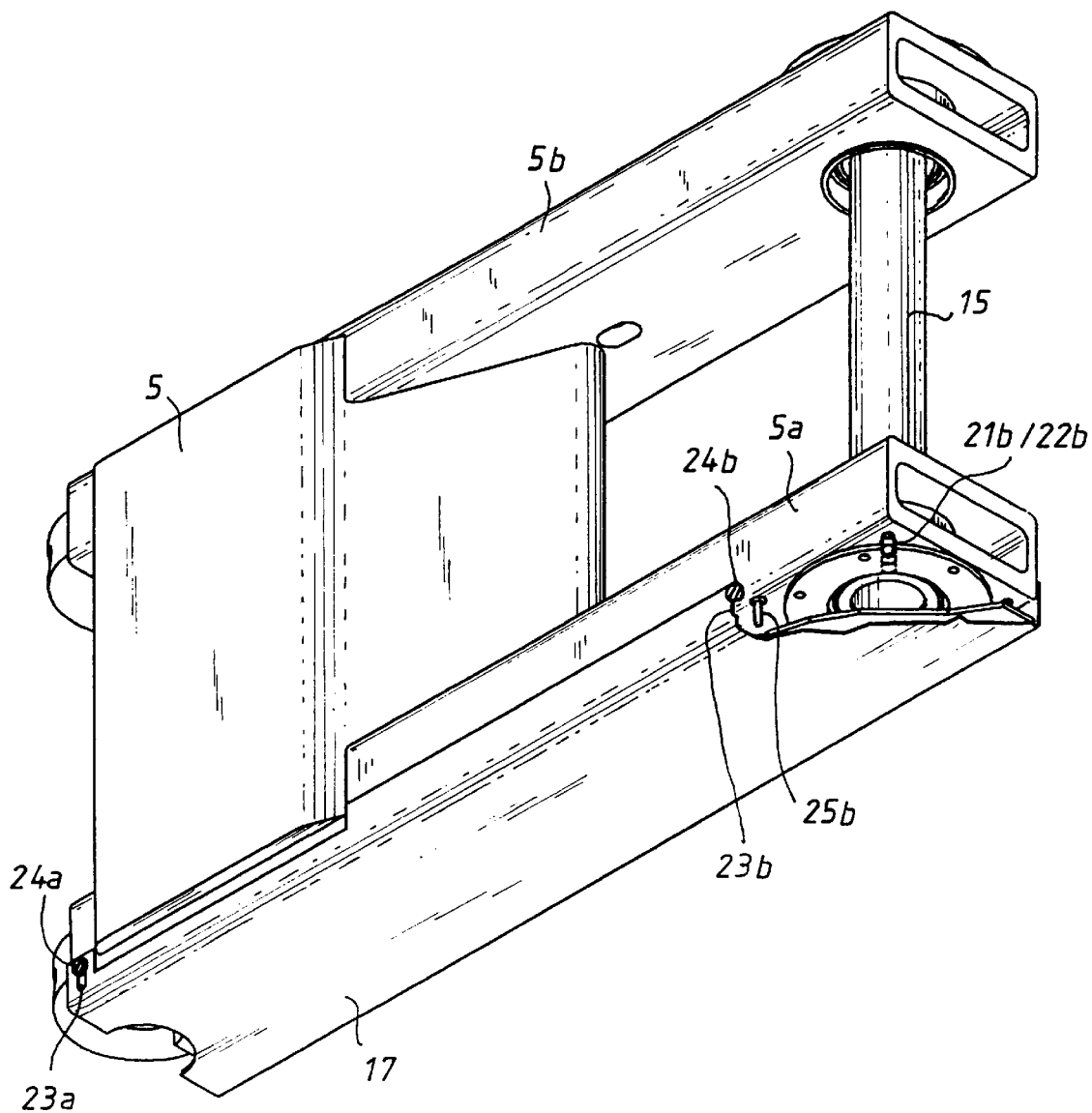
FIG. 2 is a perspective view from below of the first pivot arm of the measuring arm of FIG. 1 in a somewhat enlarged scale with this view showing the lower side of the pivot arm carrying the collision protection arrangement; and, FIG. 3 is a section view taken through the lower part 5a of the first pivot arm 5 of FIG. 2.
Figure 3:
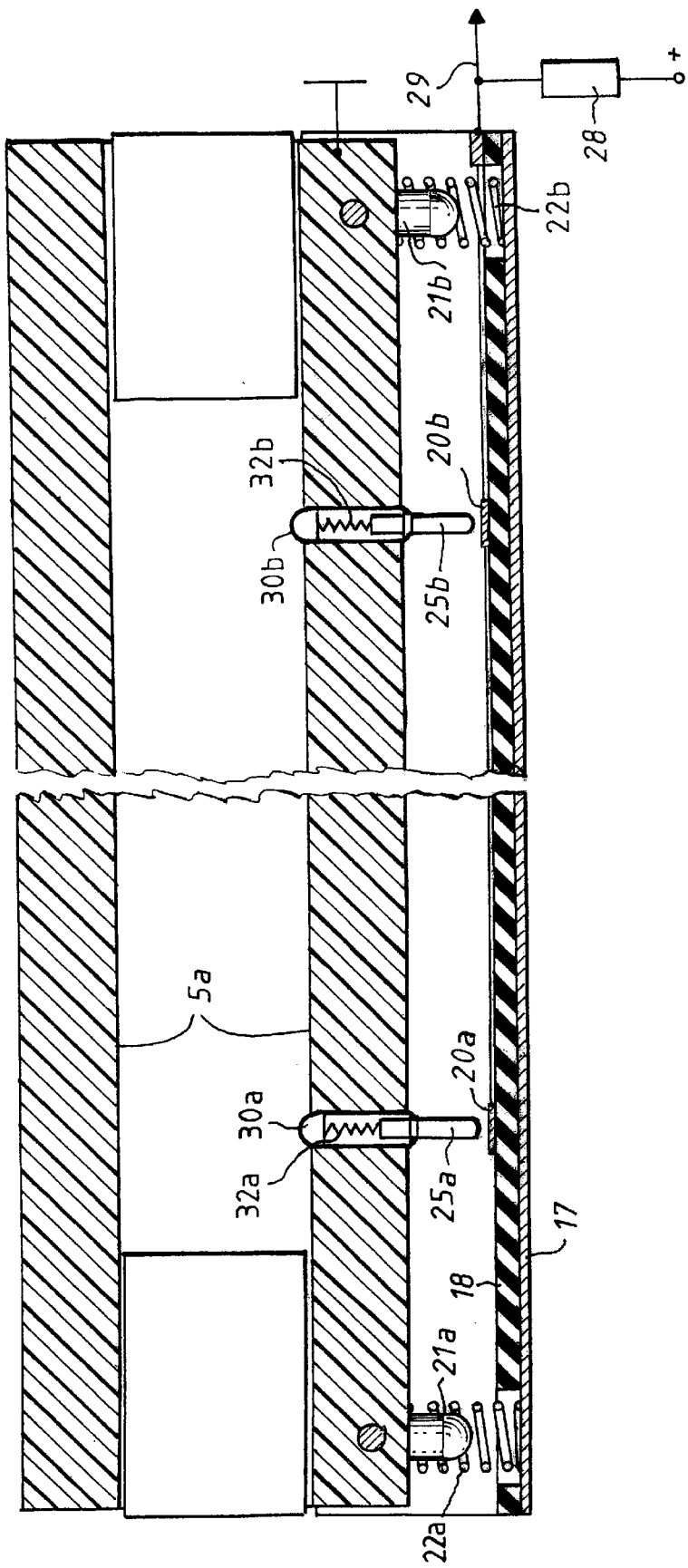

The lower side of the leg 5a (se FIG. 2) of the fork-shaped first pivot arm is covered by a spring-journalled sheet-metal part 17. This sheet-metal part 17 is bent over at each of its two longitudinal sides and has two slots (23a, 23b) on each side thereof. With these slots (23a, 23b), the sheet-metal part 17 is movably suspended on part 5a via screws (24a, 24b). The sheet-metal part 17 is movable in the direction of the axes (6 and 8). As shown in FIG. 3, pressure springs (22a, 22b) are also provided and are placed about guide bolts (21a, 21b) at the lower side of part 5a. The cover sheet-metal part 17 is held in spaced relationship in the position shown. A total of four such springs are provided.

The inner side of sheet-metal part 17 is fitted with a printed circuit board 18. The printed circuit board 18 carries several counter contacts (20a, 20b) which lie opposite to the pins (25a, 25b) of a corresponding number of resiliently-biased contact pin units seated in part 5a. Such contact pin units are commercially available and can be obtained from the Ingun Company of Germany under the product identification KS-96750. These contact pin units comprise a cylindrical metal housing (30a or 30b) into which the metal pin can be pressed against the force of a spring (32a or 32b) mounted in this housing over a distance of typically 3 mm. The part 5a is made of carbon-fiber reinforced plastic (also known as CFK) and is therefore electrically conductive. For this reason, the contact pins (25a, 25b) are electrically connected to each other in parallel. Likewise, the counter contacts (20a, 20b) are also connected in parallel as well as the counter contacts for additional contact pins not shown in FIG. 3.

The counter contacts (20a, 20b) are connected via a dropping resistor 28 to a positive potential and via line 29 to the collision protective circuit for the coordinate measuring apparatus. This collision protective circuit switches off the drive for the carrier 4 when one of the contact pins (25a, 25b) touches the counter contact thereby grounding the contact pin.

In the same way, a similar protective device can be provided also for parts to be protected on the second pivot arm.

If the pivot arm 5 should now inadvertently come into contact with its lower side on the workpiece to be measured, then the cover plate 17 will be pressed upwardly and one of the resiliently-biased contact pins 25 will touch the counter contact with its tip. This then causes a switching signal to switch off the drive for the tracking of the carrier 4. A short time delay occurs until the driven pivotally connected arm comes to a standstill. In this short time delay, the protective cover 17 continues to move further but only by approximately 0.3 mm. In this time, the contact pins (25a, 25b) yield resiliently so that no destroying forces are applied to the pivot arm or its bearings.

It is understood that the foregoing description is that of the preferred embodiments of the invention and that various changes and modifications may be made thereto without departing from the spirit and scope of the invention as defined in the appended claims.

What is claimed is:

1. A combination of a collision protective arrangement and a measuring arm of a coordinate measuring apparatus for measuring a workpiece, the combination comprising:

said measuring arm having at least one surface;

a part for covering and protecting said surface;

a circuit switchable between a first electrical state wherein no contact is present between said part and another object and a second electrical state indicative of a collision between said part and another object;

said surface and said part conjointly defining an interface;

said circuit including a plurality of electrically connected resiliently-biased contact pins mounted at said interface to switch said circuit into said second electrical state when said collision takes place;

said part being a cover covering said surface of said measuring arm;

said measuring arm being made of an electrically conductive material;

said contact pins being fixedly mounted in said measuring arm so as to be electrically interconnected by said electrically conductive material;

said circuit including a plurality of contacts mounted on said cover to coact with said contact pins;

a suspension assembly for resiliently suspending said cover from said measuring arm at a predetermined distance from said surface to permit said contacts to contact corresponding ones of said contact pins when said cover is pushed in said direction toward said surface during said collision; and, said contact pins projecting beyond said surface and being resiliently biased toward said cover whereby said contact pins yield when coming into contact engagement with said contacts, respectively, during said collision.

2. The combination of claim 1, said electrically conductive material being carbon fiber reinforced plastic.

3. The combination of claim 1, said cover being made of sheet metal.

4. The combination of claim 1, wherein said coordinate measuring apparatus includes a bearing assembly defining a pivot axis; and, said measuring arm having at least one arm segment and said arm segment being pivotally connected to said bearing assembly for pivoting about said axis.

5. A coordinate measuring apparatus for measuring a workpiece, the apparatus comprising:

a holder movably mounted for movement in a given direction;

a bearing assembly mounted on said holder and defining a pivot axis extending in said direction;

a measuring arm having at least one surface and being pivotally connected to said bearing assembly for pivoting about said axis;

a part for covering and protecting said surface;

a circuit switchable between a first electrical state wherein no contact is present between said part and another object and a second electrical state indicative of a collision between said part and another object;

said surface and said part conjointly defining an interface;

said circuit including a plurality of electrically connected resiliently-biased contact pins mounted at said interface to switch said circuit into said second electrical state when said collision takes places;

said part being a cover covering said surface of said measuring arm;

said measuring arm being made of an electrically conductive material;

said contact pins being fixedly mounted in said measuring arm so as to be electrically interconnected by said electrically conductive material;

said circuit including a plurality of contacts mounted on said cover to coact with the contact pins;

a suspension assembly for resiliently suspending said cover from said measuring arm at a predetermined distance from said surface to permit said contacts to contact corresponding ones of said contact pins when said cover is pushed in said direction toward said surface during said collision; and, said contact pins projecting beyond said surface and being resiliently biased toward said cover whereby said contact pins yield when coming into contact engagement with said contacts, respectively, during said collision.

6. A combination of a collision protective arrangement and a measuring arm of a coordinate measuring apparatus for measuring a workpiece, the combination comprising:

said measuring arm having at least one surface;

a part for covering and protecting said surface;

a circuit switchable between a first electrical state wherein no contact is present between said part and another object and a second electrical state indicative of a collision between said part and another object;

said surface and said part conjointly defining an interface;

said circuit including at least one pin assembly mounted at said interface to switch said circuit into said second electrical state when said collision takes place;

said part being a cover covering said surface of said measuring arm;

said pin assembly being mounted in said measuring arm;

said circuit further including a contact mounted on the cover to coact with said pin assembly;

a suspension assembly for resiliently suspending said cover from said measuring arm at a predetermined distance from said surface to permit said contact to contact said pin assembly when said cover is pushed in said direction toward said surface during said collision;

said pin assembly including a pin housing, a contact pin projecting beyond said measuring arm and a spring for resiliently biasing said contact pin toward said contact whereby said contact pin displaceably yields when coming into contact engagement with said contact during said collision;

said contact pin and said spring being accommodated in said pin housing;

said measuring arm being made of an electrically conductive material and said pin housing being electrically connected to said measuring arm; and, said circuit including said pin housing and said measuring arm.

7. The combination of claim 6, said circuit including: a plurality of said pin assemblies mounted in said measuring arm; said contact pins being electrically interconnected; and, a plurality of said contacts for coacting with respective ones of said contact pins and said contacts being mounted on said cover and said contacts being electrically interconnected.

8. The combination of claim 7, said measuring arm being made only of said electrically-conductive material for electrically interconnecting said pin assemblies.

9. The combination of claim 8, said measuring arm being devoid of any electrically-conductive coating or electrically-conductive layer thereon.

10. The combination of claim 7, said electrically conductive material being carbon fiber reinforced plastic.

11. The combination of claim 7, said cover being made of sheet metal.

* * * * *